(12) United States Patent
Guo et al.

(10) Patent No.: US 6,661,849 B1
(45) Date of Patent: Dec. 9, 2003

(54) MULTIPLE PAYLOAD SLICER SYSTEM WITH PRENORMALIZATION INTEGER VALUES

(75) Inventors: Bin Guo, Fremont, CA (US); Chien-Meen Hwang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/536,528

(22) Filed: Mar. 28, 2000

(51) Int. Cl.[7] .................. H04L 23/02; H04L 5/12
(52) U.S. Cl. ........................ 375/261; 375/320
(58) Field of Search ................. 375/219, 222, 375/261, 320; 370/207

(56) References Cited

U.S. PATENT DOCUMENTS

| | | | | |
|---|---|---|---|---|
| 4,985,900 A | * | 1/1991 | Rhind et al. ............. 375/226 |
| 5,444,712 A | * | 8/1995 | Betts et al. ............. 370/207 |
| 5,719,923 A | * | 2/1998 | Bremer et al. .......... 379/100.01 |
| 6,101,217 A | * | 8/2000 | Gut ....................... 375/222 |
| 6,215,818 B1 | * | 4/2001 | Velez et al. ............ 375/233 |
| 6,304,594 B1 | * | 10/2001 | Salinger ................. 375/222 |

* cited by examiner

*Primary Examiner*—Phuong Phu
(74) *Attorney, Agent, or Firm*—Renner, Otto, Boisselle & Sklar

(57) ABSTRACT

A network transceiver is configured to receive a complex modulated carrier signal from another network transceiver via a network medium. The complex modulated carrier signal may be payload encoded utilizing one of a plurality of payload encoding specifications based on network distortion characteristics. The transceiver includes an A/D converter and a mixer circuit for generating a baseband I-signal and a baseband Q-signal and a slicer which scales the baseband signals to enable complex decoding constellation coordinates to be integer values and mapping calculations to be performed with integer values.

17 Claims, 5 Drawing Sheets

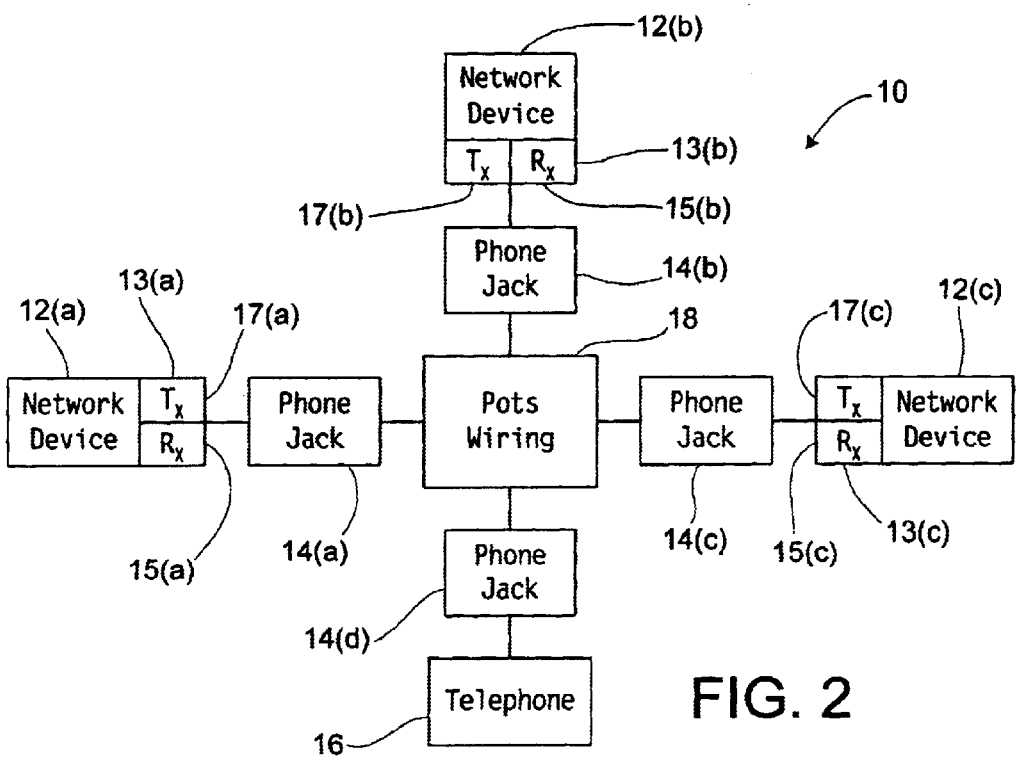
FIG. 2
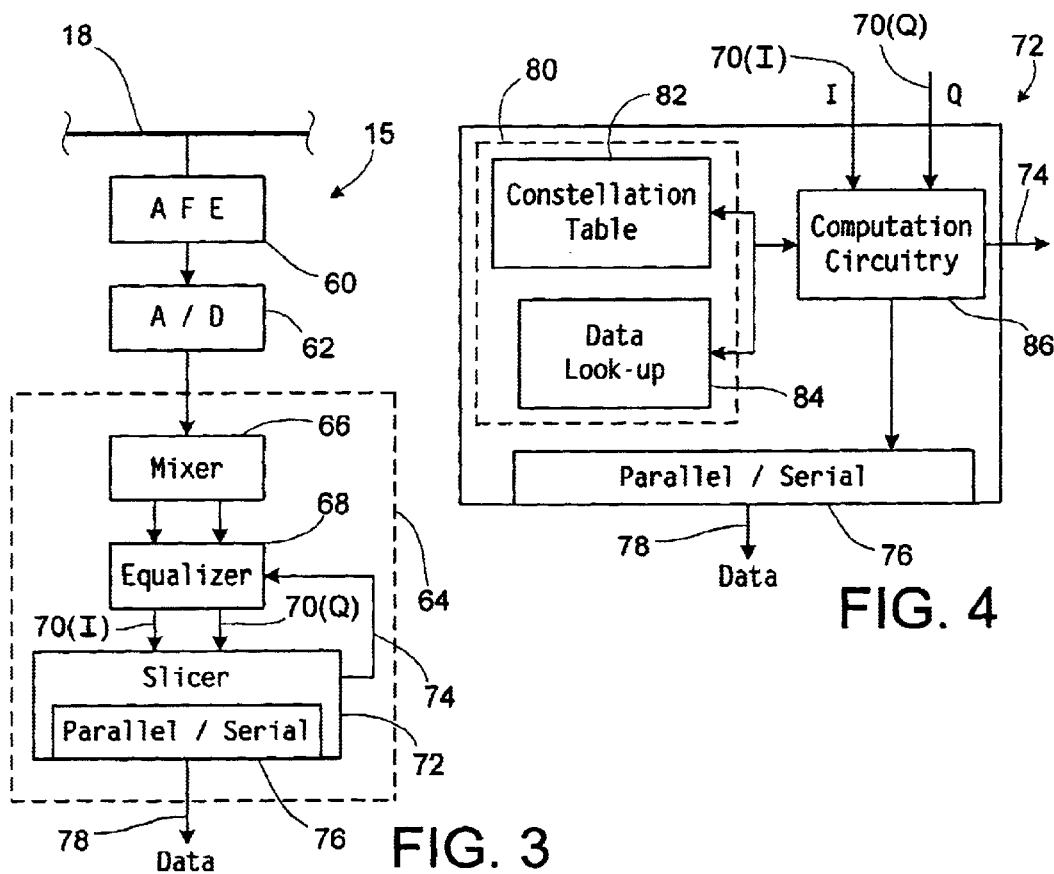
FIG. 3
FIG. 4

MULTIPLE PAYLOAD SLICER SYSTEM WITH PRENORMALIZATION INTEGER VALUES

TECHNICAL FIELD

The present invention relates generally to network interfacing, and more particularly, to an apparatus and method for slicing a received modulated signal including quadrature amplitude modulated signal to recover transmitted data.

BACKGROUND OF THE INVENTION

The transmission of various types of digital data between computers continues to grow in importance. A predominant method of transmitting such digital data includes coding the digital data and modulating a high frequency carrier signal in accordance with the coded digital data. A coding and modulation technique known as quadrature amplitude modulation provides for modulating both the carrier amplitude and the carrier phase to represent encoded data. The QAM modulated high frequency carrier signal is transmitted across a network physical transmission medium such as electrical cable, fiber optic, RF, or other medium to a remote computing station.

At the remote computing station, the high frequency carrier signal must be received, demodulated, and decoded, including slicing, to recover the original data. In the absence of any distortion across the network medium, the received signal would be identical in phase, amplitude, and frequency to the transmitted carrier and could be demodulated and decoded using known techniques to recover the original data.

One problem with networks is that the physical medium and network topology tend to distort the carrier signal, especially at high frequencies. Branch connections and different lengths of such branches cause reflections of the transmitted signal. Such problems are even more apparent in a network which uses home telephone wiring cables as the network physical medium. The typical wiring of the telephone network is designed for the "plain old telephone service" (POTS) signals in the 3–10 kilohertz frequency and are not designed for transmission of high frequency carrier signals in a frequency range greater than 1 MHz. The high frequency carrier signal is also distorted by transients in wiring characteristics due to on-hook and off-hook switching and noise pulses of the POTS (e.g. ringing). The high frequency carrier is further distorted by spurious noise caused by electrical devices operating in close proximity to the "cable" medium.

Such distortion of frequency, amplitude, and phase of the high frequency carrier signal degrades network performance and tends to impede the design of higher data rate networks.

One technique for compensating for such distortion would be to slow the data rate by using a lower payload encoding. For example, in an 8 data bits/baud payload encoding system, the receiver must distinguish between 256 distinct constellation coordinates, each representing a distinct combination of a carrier signal phase and amplitude. Each constellation coordinate corresponds to 8 bits of data information and is typically called a symbol. Alternatively, in a 4 data bits/baud payload encoding system, the receiver only needs to distinguish between 16 distinct constellation coordinates and in a 2 bits/baud payload encoding system, the receiver only needs to distinguish between 4 distinct constellation coordinates. The 2 bits/baud system will be more tolerant to distortion because the distorted carrier phase and amplitude are less likely to mis-map to an incorrect constellation coordinate.

More specifically, referring to FIGS. 1a and 1b, a known 2 bits/baud constellation 20 (2 bits per symbol) and a 4 bits/baud constellation 22 (4 bits per symbol) are shown respectively. Constellation 20 includes 4 defined constellation coordinates 24(*a*)–24(*d*). Each constellation coordinate 24(*a*)–24(*d*) represents a data symbol—a unique combination of carrier magnitude and phase. For example, the magnitude of vector 26 and the phase angle 28 correspond to constellation coordinate 24(*b*).

Constellation 22 includes 16 defined constellation coordinates. Again, each coordinate represents a unique combination of carrier magnitude and phase. For example, the magnitude of vector 32 and the phase angle 34 correspond to constellation coordinate 30(*a*) and the magnitude vector 36 and the phase angle 38 correspond to constellation coordinate 30(*b*).

It should be appreciated that both constellation 20 and 22 are QAM Square constellations in that a perimeter of an area bounded by the coordinates is square. Constellation 22, representing 2 bits/baud is actually a phase shift keying (PSK) modulation because the amplitude of all coordinates is the same. Similarly, a 3 bits/baud constellation (constellation) is also PSK.

In operation, a transmitter may transmit a modulated carrier with a particular phase and magnitude corresponding to 2/bits baud coordinate 24(*a*). Due to distortion, the receiver may detect a carrier phase and magnitude corresponding to point 40. The receiver must determine to which of the constellation coordinates 24(*a*)–24(*d*) the received point 40 corresponds in order to recover the 2 bits of transmitted data. Using a 2 bits/baud transmission, any received point within shaded area 42 will map to constellation coordinate 24(*a*). Furthermore, any received points outside the shaded area in the same quadrate will be rounded to map to constellation coordinate 24(*a*).

However, in a 4 bits/baud transmission, a transmitter may transmit a carrier with a phase and magnitude corresponding to point 30(*c*) which happens to have the same magnitude and phase as the 2 bits/baud coordinate 24(*a*). And, because of the same distortion, the receiver detects a carrier phase and magnitude corresponding to point 40. While this distortion was tolerable in a 2 bits/baud transmission, the distortion causes a mis-map in a 4 bits/baud transmission because the received point 40 is within shaded area 44 which will map to coordinate 30(*d*)—not the originally transmitted coordinate 30(*c*).

While it is therefore obvious that the lower payload encoding would be more tolerable to distortion, slowing the data rate of all transmissions on a network to overcome the worst distortion has the drawback of reducing network throughput.

Therefore, a recognized solution is to use adaptive payload encoding wherein, based on carrier distortion between a transmitter and a receiver, the maximum payload encoding can be selected which still enables the receiver to properly distinguish between combinations of carrier phase and amplitude. Therefore, if there is relatively little carrier distortion between a particular transmitter and a particular receiver, the two will negotiate a large payload encoding, such at 8 bits per baud for rapid data transmission. However, if there is significant carrier distortion between a particular transmitter and a particular receiver, the two will negotiate a smaller payload encoding, such as 2 bits per baud, to assure error free transmission.

It is desirable that the maximum carrier amplitude is the same regardless of which payload encoding is used, typically, the magnitude of both the I-value and the Q-value of the four outermost constellation coordinates in each of the QAM Square constellations (e.g. 2 bits/baud (PSK), 4 bits/baud, 6 bits/baud, and 8 bits/baud) a value equal to the square root of one half of the maximum amplitude squared and each inner coordinate to a fractional value less than such values. However, an adequate number of bits (for example 18 bits) of precision would be needed to map a symbol in the constellation tables to maintain an adequate signal to noise ratio for reliably recovering the symbol in receiver. Merely reducing the precision by one bit would decrease the signal to noise ratio by 6 db.

The problem is that in such an adaptive environment where payload encoding options include 2, 3, 4, 5, 6, 7, or 8 bits per baud, both the transmitter and the receiver must be able to accommodate all payload options. Such adaptive systems are typically implemented by digital signal processing (DSP) which enables the calculations to be performed quickly enough to transmit and receive the data. The problem is that very large, complex, and costly digital signal processing systems would be required to perform the necessary math within the necessary time window. Moreover, and at least a portion of such digital circuitry needs to be dedicated to each of the possible payload encoding options thereby increasing the total size and cost of the digital circuitry by up to a factor of up to several times that that would be needed for a non adaptive system. Therefore, based on recognized industry goals for size and cost reductions, what is needed is an adaptive slicing device and method for recovering data from a received modulated carrier that do not suffer from the size, cost, and complexity disadvantages of known systems.

SUMMARY OF THE INVENTION

A first aspect of the present invention is to provide a network transceiver configured for receiving a complex modulated carrier signal from another network transceiver via a network medium, a receiver portion of a network transceiver comprising: a) an analog to digital converter generating a digital carrier signal representing the complex modulated carrier signal; b) a mixer circuit generating a baseband I-signal and a baseband Q-signal in response to the digital carrier signal; and c) a slicer, detecting and scaling each of the I-signal and the Q-signal, calculating the minimum distance, on a complex decoding constellation, between a received data point, represented by the scaled I-signal and the scaled Q-signal, and one of a plurality of defined constellation coordinates for a particular payload encoding, and generating digital data corresponding to the one of the constellation coordinates.

The I-signal and the Q-signal represent a sequence of received data points and the slicer sequentially operates on each of a sequence of received data points to recover the corresponding data symbols.

The network transceiver may further include a memory storing a plurality of complex decoding constellations wherein each of the plurality of complex decoding constellations represents each of a plurality of payload encoding specifications to which the complex modulated carrier may comply. Each of plurality of constellation coordinates in each of the plurality of complex decoding constellations is represented by an integer I-value and an integer Q-value and is equally spaced from adjacent constellation coordinates in the complex decoding constellation. Equal spacing is accommodated by assuring that each constellation coordinate is located at both an I-coordinate value and a Q-coordinate value that are an odd multiple (e.g. 1, 3, 5, 7, etc) of an integer value Each of the plurality of complex decoding constellations includes an outermost constellation coordinate and the magnitude of the outermost constellation coordinate in each of the complex decoding constellations is approximately equal to the magnitude of the outermost constellation coordinate in each of the other of the plurality of complex decoding constellations.

In a preferred example, at least a portion of the complex decoding constellations are QAM Square constellations. Further, a portion of the complex decoding constellations may be QAM Cross constellations. The QAM Square constellations may include 2 bits/baud (PSK), 4 bits/baud, 6 bits/baud, and 8 bits/baud and the QAM Cross constellations may include 3 bits/baud (PSK), 5 bits/baud, and 7 bits/baud.

A second aspect of the present invention is to provide a method of receiving a complex modulated carrier signal from another network transceiver via a network medium, the method comprising: a) converting the complex modulated carrier signal to a digital carrier signal; b) generating a baseband I-signal and a base band Q-signal from the digital carrier signal; c) generating a scaled I-signal and a scaled Q-signal by multiplying each of the baseband I-signal and the baseband Q-signal by a scaler; d) sequentially mapping each of a scaled I-signal value and a scaled Q-signal value to one of a plurality of constellation coordinates in a complex decoding constellation; and e) generating digital data corresponding to the one of the constellation coordinates.

The method may further include selecting one of a plurality of complex decoding constellations and the step of sequentially mapping includes sequentially mapping each of a combination of a scaled I-signal value and a scaled Q-signal value to one of a plurality of constellation coordinates in the selected one of the plurality of complex decoding constellations. Each of the plurality of complex decoding constellations may represent each of a plurality of payload encoding specifications to which the complex modulated carrier may comply. Further, each of the plurality of constellation coordinates in each of the plurality of complex decoding constellations is represented by an integer I-value and an integer Q-value and is equally spaced from adjacent constellation coordinates in the complex decoding constellation.

Each of the plurality of complex decoding constellations includes an outermost constellation coordinate comprising a magnitude which is approximately equal to the magnitude of the outermost constellation coordinate in each of the other of the plurality of complex decoding constellations.

In a preferred example, at least a portion of the complex decoding constellations are QAM Square constellations. Further, a portion of the complex decoding constellations may be QAM Cross constellations. The QAM Square constellations may include 2 bits/baud (PSK), 4 bits/baud, 6 bits/baud, and 8 bits/baud and the QAM Cross constellations may include 3 bits/baud (PSK), 5 bits/baud, and 7 bits/baud.

A third aspect of the present invention is to provide a network transceiver configured for receiving a complex modulated carrier signal, modulated in accordance to one of a plurality of payload encoding specifications, from another network transceiver via a network medium, the network transceiver comprising: a) an analog to digital converter generating a digital carrier signal representing the complex modulated carrier signal; b) a mixer circuit generating a baseband I-signal and a baseband Q-signal in response to the digital carrier signal; c) a memory storing a plurality of complex decoding constellations, one constellation corresponding to each one of the plurality of payload encoding specifications, wherein each of the complex decoding constellations includes an outermost constellation coordinate with a magnitude which is approximately equal to that of the outermost constellation coordinate in each of the other of the plurality of complex decoding constellations; and d) a slicer, generating a scaled I-value and a scaled Q-value, sequentially mapping each of a combination of the scaled I-value and the scaled Q-value to one of a plurality of constellation coordinates in one of a plurality of complex decoding constellation, and generating digital data corresponding to the one of the constellation coordinates.

Preferably, each of the plurality of constellation coordinates in each of the plurality of complex decoding constellations is equally spaced from adjacent constellation coordinates in the complex decoding constellation and each is represented by an integer I-value and an integer Q-value.

In a preferred example, at least a portion of the complex decoding constellations are QAM Square constellations. Further, a portion of the complex decoding constellations may be QAM Cross constellations. The QAM Square constellations may include 2 bits/baud (PSK), 4 bits/baud, 6 bits/baud, and 8 bits/baud and the QAM Cross constellations may include 3 bits/baud (PSK), 5 bits/baud, and 7 bits/baud.

BRIEF DESCRIPTION OF THE DRAWINGS

FIG. 2 is a block diagram of a data network in accordance with one embodiment of the present invention;

FIG. 3 is a block diagram of a receiver circuit in accordance with one embodiment of this invention;

FIG. 4 is a block diagram of a slicer in accordance with one embodiment of the present invention;

DESCRIPTION OF THE PREFERRED EMBODIMENT

Figure 1A:
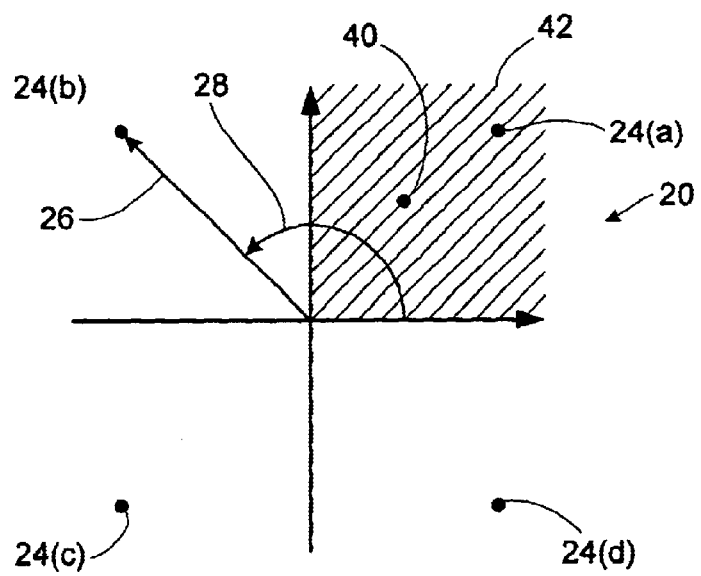
FIG. 1a is a diagram of a 2 bit/baud reference QAM encoding/decoding constellation.
Figure 1B:
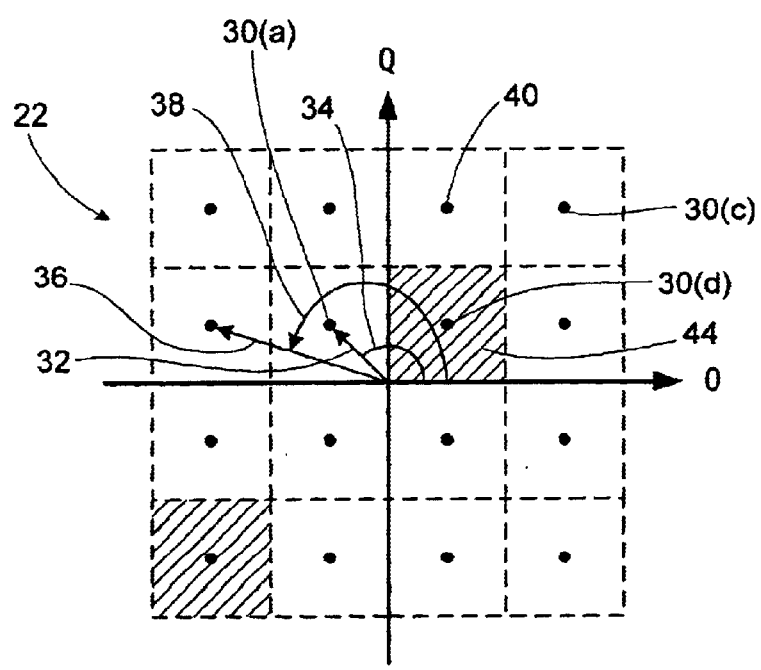
FIG. 1b is a diagram of a 4-bit/baud reference QAM encoding/decoding constellation.

The present invention will now be described in detail with reference to the drawings. In the drawings, like reference numerals are used to refer to like elements throughout.

FIG. 2 is a diagram of a local area network 10 implemented in a home environment using twisted pair network media according to an embodiment of this invention. As shown in FIG. 2, the network 10 includes network stations 12(a)–12(c) that are connected to plain old telephone service (POTS) network wiring 18 (e.g. telephone line (twisted pair) wiring) via RJ-11 phone jacks 14(a)14(c) respectively. A telephone 16 is connected to an RJ-11 phone jack 14(d) and may continue to make telephone calls while network devices 12(a)–12(c) are communicating network data.

FIG. 2 is a diagram of a local area network 10 implemented in a home environment using twisted pair network media according to an embodiment of this invention. As shown in FIG. 2, the network 10 includes network stations 12(a)–12(c) that are connected to plain old telephone service (POTS) network wiring 18 (e.g. telephone line (twisted pair) wiring) via RJ-11 phone jacks 14(a)14(c) respectively. A telephone 16 is connected to an RJ-11 phone jack 14(d) and may continue to make telephone calls while network devices 12(a)–12(c) are communicating network data.

As shown in FIG. 2, each network device 12 may be a personal computer, printer, server, or other intelligent consumer device and each includes a transceiver 13(a)–13(c), including a transmitter 17(a)–17(c) and a receiver 15(a)–15(c), for communicating with other network devices 12(a)–12(c) via the network media 18.

Each of network devices 12(a)–12(c) communicates by transmitting an analog network signal comprising a complex carrier signal modulated with network data. Preferably, network devices 12(a)–12(c) utilize quadrature amplitude modulation (QAM) wherein network data is modulated onto the carrier by varying both the amplitude and phase of the carrier in accordance with a complex encoding constellation. In the preferred embodiment, the QAM modulation adheres to the Home Phoneline Network Alliance (HPNA) 2.0 standard, as promulgated by a consortium of network equipment providers including Advance Micro Devices, Inc. of Sunnyvale, Calif. and provides for over 10 Mbit data rate.

Additionally, HPNA 1.0 network devices (not shown) may utilize pulse position modulation (PPM) wherein network data is modulated on the carrier utilizing discrete band limited pulses. The PPM modulation may adhere to the HPNA 1.0 standard and such devices may communicate data over the POTS network 18 between each other and between networked devices 12(a)–12(d) which are capable of HPNA 1.0 PPM communication in addition to QAM communication.

As discussed previously, the wiring topology of the POTS network 18 may cause significant distortion such that the strength of the signal may vary (distorting received amplitude) and the signal may have localized maxima and minima (distorting received phase). In the preferred, embodiment, payload encoding may be adaptively varied to accommodate for such distortion and to assure the maximum payload encoding for each particular network transmission and/or for a sequence of transmissions between any two particular network devices. The maximum payload encoding. is negotiated between a transmitting transceiver 12(a)–12(c) and a receiving transceiver 12(a)–12(c) by transmitting a predetermined training sequence of data at various payloads and determining the maximum payload wherein the bit error rate is below an acceptable threshold.

Referring to FIG. 3, a block diagram of a preferred example of a receiver 15 in accordance with this invention is shown. Receiver 15 includes analog front end 60 which operates to detect a modulated carrier signal on network medium 18 and appropriately amplify the carrier signal to use the full dynamic range of A/D converter 62. A/D converter 62 samples the analog carrier signal and generates a sequence of digital samples representing the carrier signal. This sequence of samples is typically referred to as the digital carrier signal and it is input to digital signal processing (DSP) circuitry 64. DSP circuitry 64 includes a mixer 66 or other implementation of a hybrid transformer for separating a baseband I-signal and a baseband Q-signal from the digital carrier signal. An equalizer 68 typically includes complex filters with variable filter coefficients for adaptively compensating for medium distortion in the received carrier signal and generates an equalized I-signal and an equalized Q-signal on lines 70(I) and 70(Q) respectively. A slicer 72, coupled to lines 70(I) and 70(Q), functions to map each received point comprising the equalized I-signal and the equalized Q-signal to one of a plurality of constellation coordinates. Each received point represents a corresponding I-value and Q-value and represents a symbol of payload encoded data bits. The slicer also feeds back error data on line 74 to equalizer 68 representing the variation between the I-value and the Q-value of each received point and the I-value and Q-value of the constellation coordinate to which the received point mapped. The error data represents the distortion error between the equalized signal and the originally transmitted signal. The equalizer 68 uses the error data to recalculate the variable coefficients to more accurately compensate for distortion. Slicer 72 also includes a symbol to bits sequencer 76 which serially sequences the payload encoded segment of data bits of the received symbol corresponding to each mapped constellation coordinate to generate data bits on line 78 representing the originally transmitted data symbol.

Referring to FIG. 4, a block diagram of slicer 72 is shown in accordance with one preferred example of this invention. Slicer 72 includes a memory 80 including an integer constellation table 82 which includes a decoding constellation corresponding to each of the possible payloads. Each coordinate in each decoding constellation is represented by an integer value. In the preferred embodiment integer constellation table 82 includes a combined table for each of a 2-bit/baud, 3-bit/baud, 4-bit/baud, 5-bit/baud, 6-bit/baud, 7-bit/baud, and 8-bit/baud payloads. As will be discussed later, the constellation table includes a QAM Square constellation for each of the 2 bit/baud (PSK), 4 bit/baud, 6 bit/baud, and 8 bit/baud payloads and a QAM Cross constellation for each of the 3 bit/baud (PSK), 5 bit/baud, and 7 bit/baud payloads. Memory 80 also includes a data look up table 84 storing the data segments corresponding to each of the constellation coordinates in each of the constellations Computation circuitry 86 operates to receive the equalized I-signal and the equalized Q-signal and map each combination of an I-value and a Q-value, defining a received coordinate point, to the closest defined constellation coordinate in the appropriate constellation. Computation circuitry 86 also operates to look up the data segment corresponding to such closest constellation coordinate and transfer such data to the symbol to serial bits sequencer 76 which outputs a binary stream of data representing the data originally encoded.

Figure 5A:
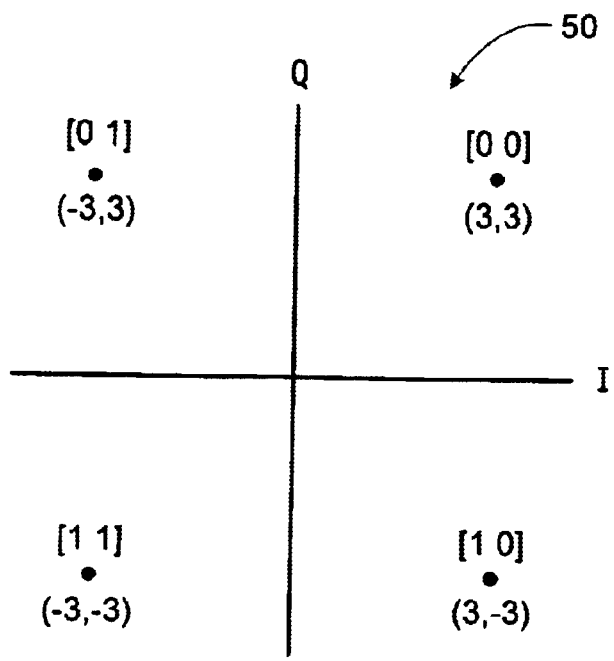
FIG. 5a is a diagram of a 2-bit/baud QAM encoding/decoding constellation in accordance with one embodiment of this invention.
Figure 5B:
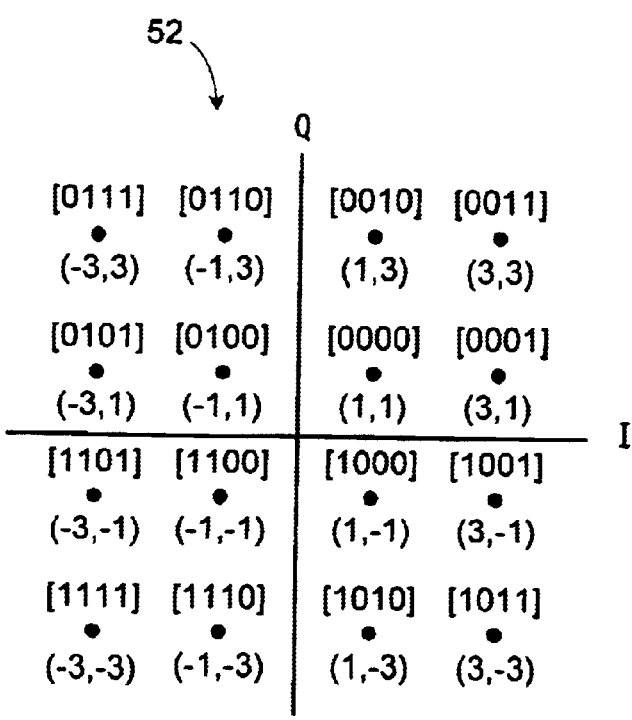
FIG. 5b is a diagram of a 4-bit/baud QAM encoding/decoding constellation in accordance with one embodiment of this invention.

Referring to FIGS. 5a and 5b, an example of a 2 bit/baud constellation 50 and a 4 bit baud constellation 52 are as may be included in integer constellation table 82 (FIG. 4) are shown respectively. Referring particularly to FIG. 5a, each constellation coordinate in the 2-bits/baud payload constellation 50 represents one of the four possible combinations of two bits of payload encoded binary data (e.g. 00, 01, 10, 11) and is located at an integer Cartesian coordinate (e.g. (3,3) (3,−3) (−3,−3) (−3,3)—The particular choice of the integer value 3 will be discussed in detail below).

When transmitting 2 bits/baud data, data to be transmitted is parsed into two bit segments as a symbol and each segment is mapped to one of the 4 constellation coordinates to determine an I-value and a Q-value representing the two bit segment of data. A sequence of I-values and Q-values formed from a sequence of segments form the baseband I-signal and baseband Q-signal respectively. The baseband I-signal and baseband Q-signal are then appropriately mixed up to a carrier frequency to generate a PSK or QAM modulated carrier.

In the receiver, the carrier signal is detected, digitized, mixed down to a baseband I-signal and a baseband Q-signal, filtered to reshape the baseband I-signal and baseband Q-signal to compensate for carrier distortion, scaled, and mapped to the closest defined constellation coordinate to recover the two bit data symbol.

Similarly, referring in particular to FIG. 5b, each constellation coordinate in the 4 bits/baud constellation 52 represents one of the 16 possible combinations of four bits of payload encoded binary data.

| | | | |
|---|---|---|---|
| 0000 | 0001 | 0010 | 0011 |
| 0100 | 0101 | 0110 | 0111 |
| 1000 | 1001 | 1010 | 1011 |
| 1100 | 1101 | 1110 | 1111 | and is located at an integer Cartesian coordinate.

When transmitting 4 bits/baud data, data to be transmitted is parsed into four bit segments as a symbol and each segment is mapped to one of the 16 constellation coordinates to determine an I-value and a Q-value representing the four bit segment of data. A sequence of I-values and Q-values formed from a sequence of segments form the baseband I-signal and baseband Q-signal respectively. The baseband I-signal and baseband Q-signal are then appropriately mixed up to a carrier frequency to generate a QAM modulated carrier.

In the receiver, the carrier signal is detected, digitized, mixed down to a baseband I-signal and a baseband Q-signal, filtered to reshape the baseband I-signal and baseband Q-signal to compensate for carrier distortion, and mapped to the closest defined constellation coordinate to recover the four bit data segment.

In the preferred example of this invention, the magnitude of the I-value and the Q-value of the four outermost constellation coordinates in each QAM Square constellations (e.g. 2 bit/baud constellation 50, 4 bit/baud constellation 52, and 6 bit/baud constellations (not shown)) is selected to be an integer value and the I-value magnitude and the Q-value magnitude of each of the other constellation coordinates are selected to be an integer value less than or equal to the magnitude of the I-value and the Q-value of the four outermost constellation coordinates. The magnitude of the received carrier signal is then scaled in a single multiplication operation and then mapped to the closets constellation coordinate simply by truncating the scaled value to an integer value.

For example, the outermost constellation coordinates in each of the 2 bits/baud constellation 50 and the 4 bits/baud constellation 52 have been assigned to have an integer I-value magnitude of three and an integer Q-value magnitude of 3. The remaining constellation points in the 4 bits/baud constellation 52 (e.g. those with an I-value magnitude and/or a Q-value magnitude that are less than those of the outermost constellation coordinate) all have an integer I-value magnitude and an integer Q-value magnitude less than three.

The magnitude of the I-value and the Q-value of the four outermost coordinates (e.g. 3) was selected because it is the minimum integer value wherein each inner coordinate in each of the 2 bit/baud and the 4 bit/baud payload constellations can be equally spaced between the 4 outermost coordinates and may have integer coordinate values. It should be appreciated that each defined coordinate is located at an odd number multiple (e.g. 1,3,5,7, . . . ) of an integer value (e.g. 1).

It should be appreciated that when additional constellations are included in Memory integer constellation table 82 (FIG. 4), the magnitude of the four outermost constellation coordinates must be calculated based on all included constellations.

More particularly, in one preferred example, integer constellation table 82 includes each of a, 4, 6, and 8 bit/baud QAM Square constellation and a 2 bit/baud PSK constellation. Each such constellation includes an outermost coordinate located at (105, 105) which is determine in accordance with the discussion below.

Figures 6, 7:
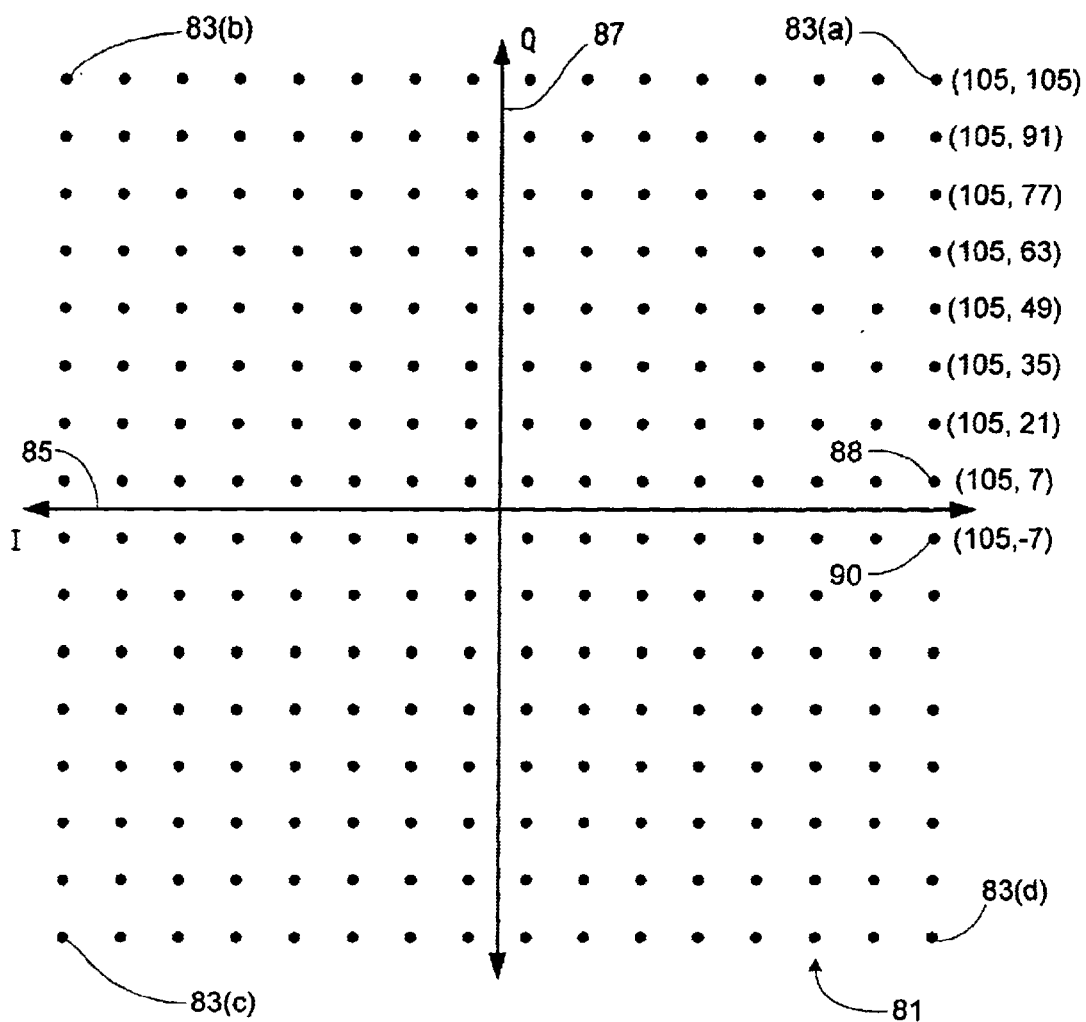
FIG. 6 is a diagram of an 8-bit/baud QAM encoding/decoding constellation in accordance with one embodiment of this invention.
FIG. 7 is a table representing coordinate spacing in a constellation arrangement in accordance with one embodiment of this invention.

Referring to FIG. 6, an 8-bit/baud QAM Square constellation 81, representing the maximum payload encoding in the preferred embodiment, is shown. Constellation 81 includes a constellation coordinate for each of the 256 distinct combinations of eight bits of binary data. The four outermost coordinates 83(*a*)–83(*d*) are located at (105,105); (−105,105); (−105,−105); and (105,−105) respectively. Each inner coordinate is separated from adjacent coordinates by a distance of 14 units along either the I-axis 85 and/or the Q-axis 87. Coordinates that are adjacent to each of the axis, such as coordinate 88 located at (105, 7) and coordinate 90 is located at (105,−7), like all. other coordinates, are separated from adjacent coordinates by a distance of 14 units.

The magnitude of the I-value and the Q-value of the four outermost coordinates 83(*a*)–83(*d*) (e.g. 105) was selected because it is the minimum integer value wherein each inner coordinate in each payload constellation (e.g. 4, 6, and 8 bits/baud) can be equally spaced between the 4 outermost coordinates and may have integer coordinate values. Therefore, the combined integer constellation table 82 (FIG. 4) can be stored in memory 80 as integer values only.

More generally, to select the outermost coordinate value, an I-denominator and a Q-denominator must be calculated for each of the QAM Square constellations in accordance with the following formulas:

I-denominator=$(2^{BI} \times 2)-1$, and

Q-denominator=$(2^{BQ} \times 2)-1$

Wherein BI and BQ represent the number of data bits defining the I-value and the Q-value in each quadrant. For example, in the 8-bit/baud constellation, 2 of the bits define the quadrant, three of the bits define the I-value of a coordinate and three of the bits define the Q-value of the coordinate such that BI is three and BQ is three. A table of BI and BQ-values for each QAM square constellation is set forth below:

| Bits/Baud | Quadrant | BI | BQ |
|---|---|---|---|
| 2 | 2 | 0 | 0 |
| 4 | 2 | 1 | 1 |
| 6 | 2 | 2 | 2 |
| 8 | 2 | 3 | 3 |

The table of FIG. 7 sets forth the I-denominator and Q-denominator values for each of the constellations calculated in accordance with the above formula. The magnitude of I and Q of the four outermost constellation coordinates is then calculated to be the smallest integer value that is divisible by each of the I denominators and Q denominators respectively using a standard least common denominator calculation. In the preferred embodiment the smallest integer value is 105. It should be appreciated that the integer value 105 and the integer value of I and Q of each inner constellation point can be represented by a 7-bit binary number such that computational complexity is significantly reduced compared to an 18-bit binary number which would be required to maintain the same signal to noise ratio and represent each outer most coordinate with a value of one and each inner coordinate with a fractional value.

Similar techniques may be used to include 5, and 7 bit/baud QAM Cross constellations and a 3 bit/baud PSK constellation in integer constellation table 82 (FIG. 4) and calculate the integer values of each coordinate in such QAM Square constellations.

Figure 8:
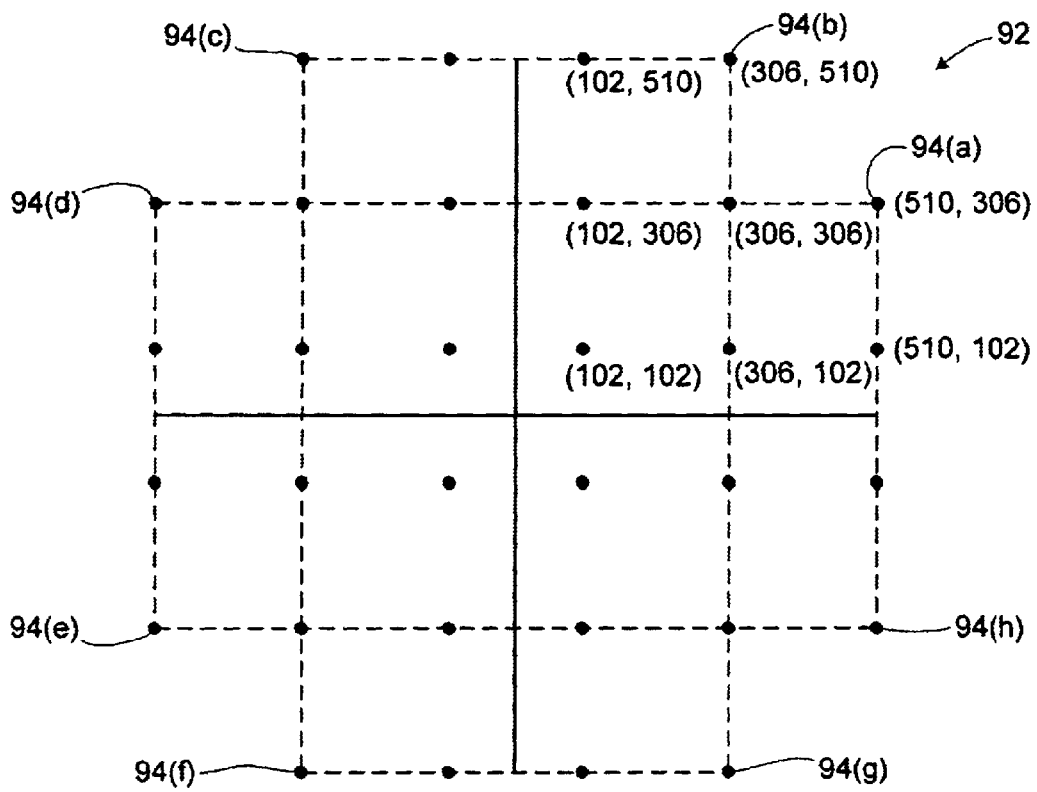
FIG. 8 is a diagram of a 5-bit/baud QAM encoding/decoding constellation in accordance with one embodiment of this invention.

For example, FIG. 8 shows a 5 bit/baud QAM Cross constellation 92. Each coordinate represents one of the 32 possible five bit combinations of binary data. There are a total of eight outermost coordinates 94(*a*)–94(*f*) in QAM Cross constellation 92. Wherein the amplitude of such coordinates is maximum.

When including such a QAM Cross constellation, each constellation coordinate in each of both of the QAM Square and the QAM Cross constellations is represented by an integer I-value and an integer Q-value and is equally spaced from adjacent coordinates. Further, the maximum amplitude of the outer most coordinates in each constellation is approximately equal.

Empirically, it has been determined that scaling each of the QAM Square constellations by an additional factor of 4 such that the outermost coordinates are have an I-value and a Q-value of 420, a 5 bit/baud QAM Cross constellation may be included with outer most coordinates having an I-value, Q-value or a Q-value, I-value of (306, 510) which is approximately the same magnitude as (420, 420). Each of the inner coordinates in constellation 92 is further represented by an I-value and a Q-value as shown.

Similarly, if a PSK 3 bit/baud constellation and a QAM Cross 7 bit/baud constellation are further included, it has been determined that by further scaling the QAM Square constellations by an additional factor of 3 such that the outermost coordinates are at (+/−1260, +/−1260), each coordinate in each of the 2, 3, 4, 5, 6, 7, and 8 bit/baud constellations may be integer with the outermost coordinates at approximately equal amplitudes.

Figure 9:
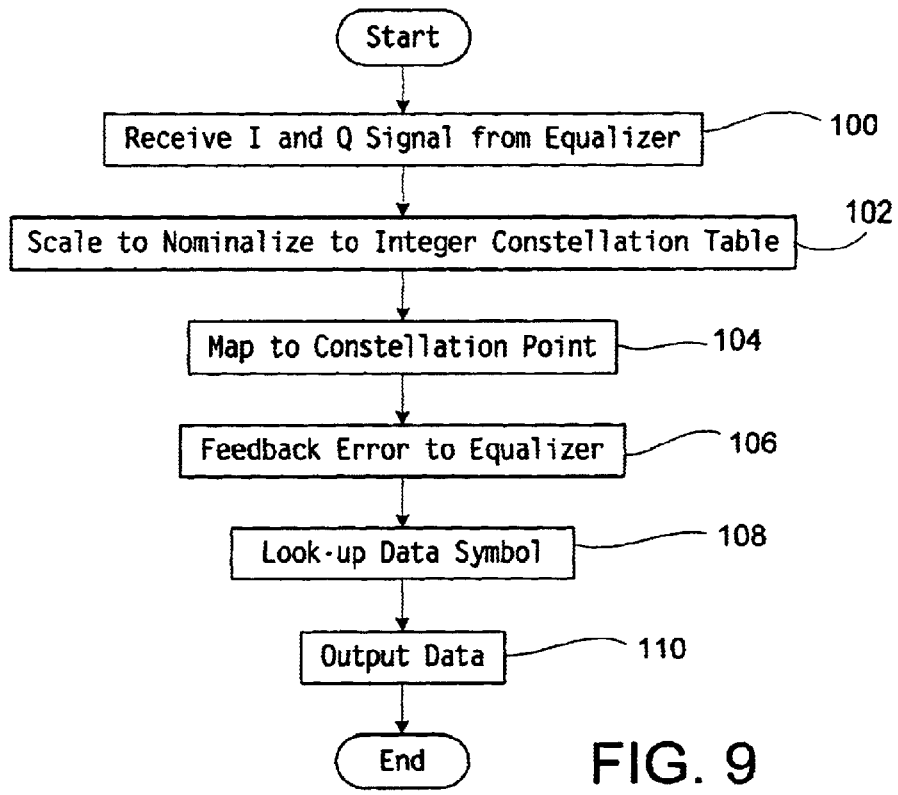
FIG. 9 is a flowchart showing operation of a slicer in accordance with one embodiment of this invention.

Referring to the flowchart of FIG. 9 in conjunction with the block diagram of FIG. 4, operation of the computation circuitry 86 in slicer 72 is shown. Step 100 represents detection of an I-value and a Q-value of a received coordinate from a received equalized I-signal and an equalized Q-signal. At step 102, both the I-value and the Q-value are scaled to an integer values to scale normalize to the integer constellation table. (e.g. maximum amplitude must normalize to the magnitude of a vector extending from the origin of the constellation to the outermost coordinate).

At step 104, a look-up table is used to map the scaled coordinate point to the closest integer coordinate point in the constellation. Step 106 represents feed back to the equalizer of a value representing the error between the received coordinate point and the coordinate point to which it mapped and feeding such error back to the equalizer. At step 108, the computation circuitry 86 looks up the binary data symbol corresponding to the constellation coordinate and at step 110, outputs the data through symbol-to-bits sequencer 76.

The above described systems and methods provide for implementation of an adaptive payload encoding QAM receiver system with reduced computation complexity and reduced hardware complexity to yield a system with reduced size and reduced cost over known systems. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A network transceiver configured for receiving a complex modulated carrier signal from another network transceiver via a network medium, the network transceiver comprising:
   a) an analog to digital converter generating a digital carrier signal representing the complex modulated carrier signal;
   b) a mixer circuit generating a baseband I-signal and a baseband Q-signal in response to the digital carrier signal;
   c) a slicer, generating a scaled I-signal and a scaled Q-signal, sequentially mapping each of a combination of an I-signal value and a Q-signal value from the scaled I-signal and the scaled Q-signal to one of a plurality of constellation coordinates in a complex decoding constellation, and generating digital data corresponding to the one of the constellation coordinates, and
   d) a memory storing a plurality of different complex decoding constellations wherein each of the plurality of complex decoding constellations respectively represents each of a plurality of different payload encoding specifications having defined constellation coordinates, each of the plurality of constellation coordinates in each of the plurality of complex decoding constellations being represented by an Integer I-value and integer Q-value,
      wherein the slicer scales the magnitude of the I-value and the Q-value of the four outermost constellation coordinates for one of the plurality of complex decoding constellations to all integer value so that the inner constellation coordinates for each of the remaining plurality of complex decoding constellations are equally a aced from adjacent constellation coordinates between the four outermost constellation coordinates and have integer coordinate values represented by the integer I-values and integer Q-values stored in the memory.

2. The network transceiver of claim 1, wherein the I-signal and the Q-signal represent a sequence of received data points and the slicer sequentially operates on each of a sequence of received data points.

3. The network transceiver of claim 1, wherein each of the plurality of complex decoding constellations includes an outermost constellation coordinate and the magnitude of the outermost constellation coordinate in each of the complex decoding constellations is approximately equal to the magnitude of the outermost constellation coordinate in each of the other of the plurality of complex decoding constellations.

4. The network transceiver of claim 3, wherein at least a portion of the complex decoding constellations are QAM Square constellations.

5. The network transceiver of claim 4, wherein at least a portion of the complex decoding constellations are QAM Cross constellations.

6. The network transceiver of claim 5, wherein the QAM Square constellations include 2 bits/baud, 4 bits/baud, 6 bits/baud, and 8-bits/baud and the QAM Cross constellations include 3 bits/baud, 5 bits/baud, and 7 bits/baud.

7. A method of receiving a complex modulated carrier signal from another network transceiver via a network medium, the method comprising:
   a) converting the complex modulated carrier signal to a digital carrier signal;
   b) generating a baseband I-signal and a base band Q-signal from the digital carrier signal;
   c) generating a scaled I-signal and a scaled Q-signal by multiplying each of the baseband I-signal and the baseband Q-signal by a scaler;
   d) sequentially mapping each of a scaled I-signal value and a scaled Q-signal value to one of a plurality of constellation coordinates in a complex decoding constellation;
   e) generating digital data corresponding to the one of the constellation coordinates; and
   f) storing in a memory a plurality of different complex decoding constellations wherein each of the plurality of complex decoding constellations respectively represents each of a plurality of different payload encoding specifications having defined constellation coordinates, each of the plurality of constellation coordinates in each of the plurality of complex decoding constellations being represented by an integer I-value and integer Q-value,
      wherein step c) comprises the step of scaling the magnitude of the I-value and the Q-value of the four outermost constellation coordinates for one of the plurality of complex decoding constellations to an integer value so that the inner constellation coordinates for each of the remaining plurality of complex decoding constellations are equally spaced from adjacent constellation ordinates between the four outermost constellation coordinates and have integer coordinate values represented by the integer I-values and integer Q-values stored in the memory.

8. The method of claim 7, wherein each of the plurality of complex decoding constellations includes an outermost constellation coordinate and the magnitude of the outermost constellation coordinate in each of the complex decoding constellations is approximately equal to the magnitude of the outermost constellation coordinate in each of the other of the plurality of complex decoding constellations.

9. The method of claim 8, wherein at least a portion of the complex decoding constellations are QAM Square constellations.

10. The method of claim 9, wherein at least a portion of the complex decoding constellations are QAM Cross constellations.

11. The method of claim 10, wherein the QAM Square constellations include 2 bits/baud, 4 bits/baud, 6 bits/baud, and 8-bits/baud and the QAM Cross constellations include 3 bits/baud, 5 bits/baud, and 7 bits/baud.

12. A network transceiver configured for receiving a complex modulated carrier signal, modulated in accordance to one of a plurality of payload encoding specifications, from another network transceiver via a network medium, the network transceiver comprising:
   a) an analog to digital converter generating a digital carrier signal representing the complex modulated carrier signal;
   b) a mixer circuit generating a baseband I-signal and a baseband Q-signal in response to the digital carrier signal;

c) a memory storing a plurality of complex decoding constellations, one constellation corresponding to each one of the plurality of payload encoding specifications, wherein each of the complex decoding constellations includes an outermost constellation coordinate with a magnitude which is approximately equal to that of the outermost constellation coordinate in each of the other of the plurality of complex decoding constellations; and d) a slicer, generating a scaled I-signal and a scaled Q-signal, sequentially mapping each of a combination of the scaled I-signal value and the scaled Q-signal value to one of a plurality of constellation coordinates in one of a plurality of complex decoding constellations, and generating digital data corresponding to the one of the constellation coordinates, wherein the slicer scales the magnitude of the I-value and the Q-value of the four outermost constellation coordinates for one of the plurality of complex decoding constellations to an integer value so that the inner constellation coordinates for each of the remaining plurality of complex decoding constellations are equally spaced from adjacent constellation coordinates between the four outermost constellation coordinates and have integer coordinate values represented by the integer I-values and integer Q-values stored in the memory.

13. The network transceiver of claim 12, wherein at least a portion of the complex decoding constellations are QAM Square constellations.

14. The network transceiver of claim 13, wherein at least a portion of the complex decoding constellations are QAM Cross constellations.

15. The network transceiver of claim 14, wherein the QAM Square constellations include 2 bits/baud, 4 bits/baud, 6 bits/baud, and 8-bits/baud and the QAM Cross constellations include 3 bits/baud, 5 bits/baud, and 7 bits/baud.

16. The network transceiver of claim 1, wherein each of the plurality of complex decoding constellations includes an outermost constellation coordinate comprising the constellation coordinate with the largest integer I-value and the largest integer Q-value, and the integer I-value,and the integer Q-value of the outermost constellation coordinate In each of the complex decoding constellations is equal to the integer I-value and the integer Q-value of the outermost constellation coordinate in each of the other of the plurality of complex decoding constellations.

17. The network transceiver of claim 16, wherein the scaled I-signal and the scaled Q-signal are generated by multiplying the baseband I-signal and the baseband Q-signal, respectively, by a scaler, the scaler comprising the square root of the sum of the square of the integer I-value plus the square of the Integer Q-value divided by the square root of the sum of the square of a baseband I-signal value representing maximum carrier signal amplitude plus the square of a baseband Q-signal value representing maximum carrier signal amplitude.

* * * * *